United States Patent [19]

Becker et al.

[11] Patent Number: 4,966,801
[45] Date of Patent: Oct. 30, 1990

[54] LIGHTWEIGHT COMPOSITE MATERIAL

[75] Inventors: Robert Becker, Leverkusen; Gerd Goldmann, Krefeld; Ulrich von Gizycki, Leverkusen; Wulf von Bonin, Odenthal, all of Fed. Rep. of Germany

[73] Assignee: Bayer Aktiengesellschaft, Leverkusen, Fed. Rep. of Germany

[21] Appl. No.: 276,670

[22] Filed: Nov. 25, 1988

[30] Foreign Application Priority Data

Dec. 8, 1987 [DE] Fed. Rep. of Germany ....... 3741539

[51] Int. Cl.$^5$ ............................................... B32B 5/12
[52] U.S. Cl. ..................................... 428/113; 427/370; 427/373; 428/109; 428/114; 428/131; 428/224; 428/232; 428/294; 428/304.4; 428/408; 428/902; 428/297; 428/137

[58] Field of Search ................ 427/370, 373; 428/221, 428/224, 131, 137, 304.4, 910, 902, 408, 294, 109, 114, 232, 294, 113, 297

[56] References Cited

U.S. PATENT DOCUMENTS

| | | | |
|---|---|---|---|
| 4,470,238 | 9/1984 | Maistre | 428/105 |
| 4,686,134 | 8/1987 | Ono | 428/109 |
| 4,777,069 | 10/1988 | Cederberg et al. | 428/113 |

*Primary Examiner*—James J. Bell
*Attorney, Agent, or Firm*—Connolly & Hutz

[57] ABSTRACT

A lightweight composite material is disclosed which comprises three-dimensionally arranged fibers of at least 50 mm length provided in a thermoplast matrix. The thermoplast matrix is thermally treated to form cavities within the matrix.

20 Claims, 1 Drawing Sheet

LIGHTWEIGHT COMPOSITE MATERIAL

This invention relates to a lightweight composite material containing reinforcing fibres in a thermoplastic matrix, to a composite material which is converted into this lightweight composite material by a heat treatment accompanied by an increase in volume, to a process for the production of the lightweight composite material and to the composite material and moulded parts containing or consisting of the lightweight composite material.

Compact composite materials containing reinforcing fibres in a thermoplastic matrix are known. These include semifinished goods in the form of boards reinforced with fabrics, predominantly two-dimensional knitted reinforcements, unidirectional layers of fibres, non-woven webs and mats with an anisotropic or quasiisotropic arrangement of fibres.

Such composite materials generally have satisfactory tensile-strengths, flexural strengths and impact, strengths as well as a sufficient capacity for energy absorption but they have relatively high unit weights.

Semifinished goods such as glass mat reinforced thermoplasts, for example, may be produced discontinuously in presses which operate in cycles or continuously in double conveyor belt presses. These products can be reshaped to produce finished products in which the reinforcing fibres are contained in the compact, thermoplastic continuous material.

In addition to such compact composite materials, composite materials with a low unit weight are also available, such as composite materials which have a honeycomb or foam core and solid covering layers. The core and the covering layers for these products must be produced separately and bonded together, e.g. by means of adhesives. The method of production is therefore expensive and the mechanical properties are frequently not satisfactory.

Known composite materials which contain reinforcing fibres and have low unit weights invariably contain duromers as the plastics matrix. Once this matrix has hardened, the shape of these composite materials can no longer be changed.

In one type of composite material containing reinforcing fibres which has recently become known, the reinforcing fibres are in the form of warp knitted pieces containing knops. This knitted reinforcement is fixed with phenol resins and is therefore also incapable of being reshaped by heat (see Hoechst High Chem Magazin No. 3, 1987, page 55).

Thermoplast reinforcing fibre combinations containing 20 to 70% by weight of reinforcing fibres are described in EP-A-0 148 763. The reinforcing fibres are arranged at random in the form of a mat and undergo an increase in volume when heated. It is specifically stated that an optimum increase in volume can only be obtained if the reinforcing fibres are hot longer than 50 mm.

A lightweight composite material has now been found which is characterised in that it contains three-dimensionally arranged reinforcing fibres over 50 mm in length in a thermoplastic matrix which contains cavities.

The three-dimensionally arranged reinforcing fibres may vary in length from over 50 mm to endless fibres which may be present, for example, as individual fibres (monofils), rovings, strands, yarns, twisted yarns or cables. Three-dimensional arrangements composed of individual filaments are preferred. The individual filaments preferably have diameters in the range of 0.5 to 25 $\mu$m and lengths from 50 mm to endless. Reinforcing fibres and filaments are generally regarded as endless if they have lengths of over 50 mm but especially if their length is substantially equal to the length of the articles produced from the lightweight composite material.

The reinforcing fibres may have any of a wide variety of chemical structures, provided only that they have a higher softening or melting point than the thermoplastic matrix. Examples of suitable fibre materials include inorganic materials such as silicate and non-silicate glass of various types, carbon, boron, silicon carbide, metals, metal alloys, metal oxides, metal nitrides, metal carbides and silicates, and organic materials such as natural and synthetic polymers, e.g. polyacrylonitriles, polyesters, ultrahigh stretched polyolefine fibres, polyamides, polyimides, aramides, liquid crystal polymers, polyphenylene sulphides, polyether ketones, polyether ether ketones, polyether imides, cotton and cellulose. High melting materials are preferred, e..g. glass, carbon. aramides, liquid crystal polymers, polyphenylene sulphides, polyether ketones, polyether ether ketones and polyether imides.

The reinforcing fibres may be uniformly distributed in the lightweight composite materials according to the invention or they may be more concentrated in certain parts of the material, e.g. near the edges and/or in special reinforcing zones, than in the other parts.

It is an essential feature of the lightweight composite material according to the invention that the reinforcing fibres, which are over 50 mm in length, are arranged three-dimensionally. This may be achieved by starting with a formation of reinforcing fibres in which the empty spaces amount, for example, to at least 30 vol.-%, preferably 50 to 97 vol.-%. and impregnating these fibres with a suitable thermoplast, for example as described in more detail below.

This is carried out at an elevated temperature and under pressure so that the thickness of the formation of reinforcing fibres decreases. If the pressure applied during impregnation is 50 bar, for example, the thickness of the formation of reinforcing fibres generally decreases by at least 10%, preferably by 40 to 97%. The lightweight composite materials according to the invention may be obtained by heat treating the impregnated formation of reinforcing fibres at a lower pressure than that employed for impregnation or without pressure. The impregnated formation of reinforcing fibres then expands, preferably in the direction perpendicular to the surface of the material, to result in a lightweight composite material in which reinforcing fibres are three-dimensionally arranged in a thermoplastic matrix containing cavities.

In the impregnated formation of reinforcing fibres and thermoplast which has not yet been subjected to a thermal after-treatment (hereinafter referred to as composite material), the reinforcing fibres thus not only have the usual function of improving mechanical properties such as the tensile strength, flexural strength, impact strength and energy absorption but also serve to cause the material to expand under the heat treatment (after impregnation with thermoplasts) and give rise to the formation of a thermoplastic matrix containing cavities in which the reinforcing fibres are three-dimensionally arranged.

The initial formations of reinforcing fibres over 50 mm in length may consist, for example, of any woven, knitted, braided, crocheted or stitched fabrics or non-woven webs or layers which contain the minimum volume of cavities indicated above and which undergo the above-mentioned minimum reduction in thickness when pressure is applied.

Preferred ations of reinforcing fibers are those which are made up into multilayered weaves (so-called spacing weaves), in particular with threads extending at least in part parallel to the perpendicular to the surface of the weave, those which are obtainable by three-dimensional braiding, those which are obtainable by the so-called Through-The-Thickness-Braiding-Method (see R. T. Brown, 30th National Sampe Symposium, USA, Mar., 19–21 (1985)). those made up into a compressible knitted and/or warp knitted pattern and those compressible three-dimensional structures which are obtainable by knitting or warp knitting, sewing, laying and/or braiding flat or three-dimensional textile structures (such as woven or knitted fabrics, braids, mats, non-woven webs and sewn and/or crocheted goods).

All types of high pile fabrics are also preferred, for example fabrics produced from plush threads or plush loops on knitting machines, automatic warp knitting machines or Raschel machines or fabrics of this kind with filling threads introduced at predetermined points, and turkish towelling weaves of all kinds and cut pile fabric. These include compressible special knitted fabrics produced on Raschel machines with special attachments for producing, for example, fleeces, broken surface fabrics and composite and crepe fabrics. These include in particular knitted or warp knitted shag fabric in which a fleece of fibres arranged at random or in parallel is taken up by the needles of the machine in such a manner that stitches are formed from the fleece and an added thread to keep the fleece together. These high pile fabrics, special knitted fabrics and shag fabrics are preferably arranged in two layers with the crimped sides or fleece sides facing each other so that the outer zones of the sandwich structure have a higher content of reinforcing fibres.

Also suitable are all multilayer textile constructs, such as multilayer woven materials, including those, wherein a plurality of layers is connected by pole fibres.

Knitted or warp knitted fabrics obtainable with a right/right (RR) pattern with two rows of needles are particularly preferred, e.g. RR flat knitted goods, RR circular knitted goods and RR flat warp knitted goods such as are obtainable, for example, on automatic warp knitting machines or Raschel machines.

The knitting constructions may include, for example, RR knitted fabrics of the series 1/1, 2/2 ... n/n or patterns of the type $\frac{1}{2}, \frac{1}{3}$ ... 1/n: $\frac{2}{3}$, 2/4 ... 2/n and, in general terms, m/n. RRG Patterns (right/right/crossed over) and RRg patterns (right/right/ribbed) are also of interest, as well as RR patterns with loops, particularly all patterns of the polka rib and half cardigan type. These include patterns in which knops and other points or lines of thickenings are introduced in predetermined positions, for example by the provision of loops. So-called woven knitting patterns (see Weber:

Die Wirkerei und Strickerei, Melliand, Heidelberg, 1981, pages 80-83) and corresponding warp knitting patterns which constitute relatively unstretchable combinations of stitches, float stitches and loops are also of interest.

Patterns obtainable with drawn needles are also advantageous, for example the 2/2 and 3/3 patterns illustrated in FIGS. 1 to 5:

BRIEF DESCRIPTION OF THE DRAWINGS

FIG. 1 shows a 2/2 RR pattern with a needle set-up of 2:1.

FIG. 2 shows a 3/3 RR pattern with needle set-up 3:1.

FIG. 3 shows a 3/3 RR pattern with needle set-up 3:2.

FIG. 4 shows a 3/2 RR pattern in which the number of right sided stitches is the same at the front and at the back.

FIG. 5 shows a 3/2 RR pattern in which the ratio of the number of right sided stitches at the front and at the back, respectively, is 3:2.

FIG. 6 shows a sandwich structure obtained by placing together two of the pattern formations shown in FIG. 5.

Figure 1:
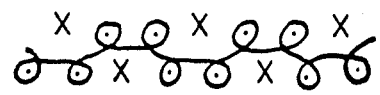
FIGS. 1–6 illustrate preferred formations of the reinforcing fibers using patterns available with drawn needles, wherein x denotes drawn needle and . denotes needle present.
Figure 2:
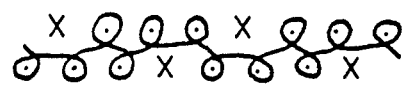
Figure 3:
Figure 4:
Figure 5:
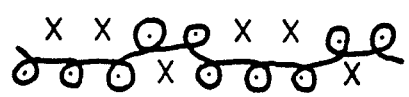
Figure 6:
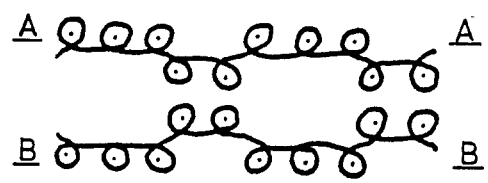

In patterns with m=n, it is possible to obtain a symmetrical arrangement with the same number of right sided stitches on both sides (see FIG. 4) as well as an asymmetrical arrangement (see FIG. 5). The reinforcing ratio between surfaces in contact of multilayered formations of reinforcing fibres can thus be tailormade for the particular requirement of any lightweight composite material. For example, two layers of the knitted fabric shown in FIG. 5 may be placed together in such a manner that a larger number of reinforcing fibres are situated on the outside than on the inside (see FIG. 6, where a larger number of reinforcing fibres lie along the lines A—A and B—B than between them). Increased flexural strength may thus be obtained in a sort of sandwich structure. Constructions similar to that of FIG. 6 may also be obtained with other textile patterns and/or combinations of different textiles.

The large variety of possible patterns of stitches enables the arrangement of reinforcing fibres to be optimized for any particular application.

The lightweight composite material according to the invention may contain one or more layers of the initial formation of reinforcing fibres with three-dimensionally arranged fibres. The reinforcing fibres may be arranged the same or differently in different layers.

In addition to the three-dimensionally arranged reinforcing fibres, lightweight composite materials according to the invention may contain covering and/or interlayers of any other materials, for example, composite layers containing predominantly one-dimensionally or twodimensionally arranged reinforcing fibres, such as basket weave fabrics.

The thermoplast matrix of the lightweight composite materials according to the invention may consist of any of a wide variety of thermoplastic materials. The essential feature is that the thermoplast should have a lower softening interval or melting point than the material of which the reinforcing fibres are composed. Suitable materials therefore include, for example, thermoplasts in the widest sense, i.e. materials which are reversibly or intermediately thermoplastic, e.g. thermoplastic resins and thermoplastic phases of duromers and interpenetrating polymeric networks (JPN) with thermoplastic properties. Examples of thermoplasts include polyolefines, vinyl polymers such as polyvinyl halides, polyvinyl esters, polyvinyl ethers, polyacrylates, polymethacrylates, polymethacrylimides and organic cellulose esters as well as polyamides, polyarylamides, polyurethanes, polyureas, polymides, polyesters, polyarylesters, polyethers, polystyrenes, polyhydantoins, polyphenylene oxides, polyphenylene sulphides, polysulphones, polycarbonates, polyestercarbonates, polyacetales, phenol resin precursors, furan resin precursors, melamine resin precursors, epoxy resin precursors, compounds containing double bonds capable of polymerisation and/or polyaddition, polyimide precursors, polyether ketones, polyether ether ketones, polyether ketone ketones, polyether sulphones, polyphenyl sulphones, polyether imides, polyamide imides, polybismalein imides, polyfluoroalkenes and liquid crystal polymers; also, apolar thermoplastic polymers (e.g. polyolefines) in which the polar groups were grafted.

Preferred thermoplasts include polyethylenes, polypropylenes, polybutylenes, polypentenes, polyvinyl chlorides, polymethyl methacrylates, polyacrylonitriles, polymethacrylonitriles, multiphase plastics containing polystyrene, such as ABS, polyamides of the type 6 and 6-6, polyurethanes, polyethylene terephthalates, polybutylene terephthalates, bisphenol-A polycarbonates, polyphenylene sulphides, polyether ketones, polyether ether ketones, polyether ketone ketones, polyether sulphones, polyphenyl sulphones, polysulphones, polyetherimides, polyamidimides, polyester carbonates, liquid crystal polymers and polypropylene in which the polar groups were grafted.

The thermoplasts may also be present in various combinations, e.g. as copolymers, block polymers, graft polymers, copolymers and polymer mixtures.

The reinforcing fibres may have the same chemical structure as the thermoplast, e.g. both may be polyesters, but in that case it is also essential the the material of the reinforcing fibres should have a higher softening interval or melting point than the material of the thermoplast matrix.

The ratio by weight of reinforcing fibres to thermoplast in the lightweight composite material according tot he invention may vary within wide limits but the material should contain sufficient thermoplast for complete or at least substantial impregnation of the reinforcing fibres present and sufficient reinforcing fibres to produce the required reinforcing effect. For example, the proportion of reinforcing fibres in the lightweight composite material according to the invention may be from 15 to 90% by weight and is preferably in the range of from 30 to 85% by weight.

One particular embodiment of the lightweight composite materials according to the invention is characterised in that the thermoplast matrix contains not only cavities produced by expansion of the material, caused by the reinforcing fibres moving into an upright position (in the heat treatment after impregnation of the reinforcing fibres with thermoplast) but also cavities produced by gases introduced into the thermoplast matrix and/or released therefrom. Examples of gases suitable for this purpose include carbon dioxide, steam, vapours of readily volatile solvents such as methanol, acetone or methylene chloride, oxygen, nitrogen, air, ammonia, amines, carbon tetrafluoride and hydrocarbons which are fluorinated and optionally in addition chlorinated. Such gases may be obtained from solids which are introduced into the thermoplast matrix and release the gases when heated. Isatoic acid anhydride is an example of such a solid. These gases may also be released form the thermoplast material, either by the opening of a chemical bond or by decrease of their physical solubility. Such gases are preferably produced by thermally releasing water or solvents which are physically dissolved in the thermoplast material or bound by van de Waal's forces. The thermoplast material may be specially pretreated for this purpose to ensure that a sufficient quantity of gas is available to be released. In many cases, however, the treatment which must in any case be carried out on the thermoplast material is sufficient, for example, the conditioning of polyamides with water or the treatment of polycarbonates with chlorinated hydrocarbons. The thermoplast material may also be allowed to froth up to form a sort of foam, for example by the method conventionally employed in the production of polyurethanes or polystyrene foams.

The gases introduced into the thermoplast matrix and/or released therein may also have the effect of facilitating the formation of cavities in the lightweight composite material according to the invention (in the heat treatment after the impregnation of the reinforcing fibres with thermoplasts) without giving rise to any additional cavities.

Another particularly preferred embodiment of the lightweight composite materials according to the invention is characterised in that the cavities in the thermoplast matrix are modified. Examples include cavities which are partly or completely filled with gases, liquids and/or solids. The solids in these cavities may consist, for example, of flame-retardants or thin metal layers while gases and liquids may be of the type which increase or lower the thermal conductivity. A liquid for heat exchange purposes or other purposes may also be arranged to flow through the cavities.

The present invention further relates to a composite material which is characterised in that reinforcing fibres, which are over 50 mm in length and capable of a three-dimensional arrangement( are contained in a compressed state in a thermoplast matrix of the material.

The composite material according to the invention may be identical with the lightweight composite material according to the invention in the quality and quantity of the reinforcing fibres and the thermoplasts. In contrast to the lightweight composite material according to the invention, however, the composite material according to the invention contains little or no cavities in the thermoplast matrix and the reinforcing fibres are in a compressed state, i.e. pressed flat. Cavities already present in the composite material according to the invention may result in lightweight composite materials according to the invention which combine a high reinforcing fibre content with low unit weight.

The composite materials according to the invention may be obtained by proceeding as described above for the production of a lightweight composite material according to the invention but without the heat treatment after the impregnation. The composite materials according to the invention are therefore intermediate products for the production of lightweight composite materials according to the invention.

It is characteristic of the composite materials according to the invention that at least in part of their surface they are less thick than the single layered or multilayered structure of reinforcing fibres which has not yet been impregnated with thermoplast as well as being less thick than the lightweight composite material according to the invention which is obtainable from the composite material according to the invention.

The conversion of a lightweight composite material according to the invention into a shaped or finished part such as a seat shell may be carried out simultaneously with the heat treatment which follows the impregnation of the reinforcing fibres with a thermoplast, i.e. with the composite material according to the invention. Both the composite material according to the invention and the lightweight composite material according to the invention are therefore saleable commodities.

A preliminary stage of the composite material according to the invention may also be marketed as saleable goods, for example a mixture of thermoplasts with three-dimensionally arranged reinforcing fibres over 50 mm in length in which the fibres have not yet been impregnated with the thermoplast. This product is preferably a three-dimensional structure which contains the thermoplast in fibre form, for example in the form of a mixed fibre knitted, woven or braided fabric or a non-woven sheet of mixed fibres or in the form of stitched or crocheted goods containing thermoplast fibres and reinforcing fibres. Such precursors of the composite material according to the invention may first be subjected to a heat treatment under pressure to convert them into the composite material according to the invention (this treatment being accompanied by impregnation of the reforcing fibres with the thermoplasts) and this composite material may, if desired, be immediately converted in the same apparatus into a lightweight composite material according to the invention by treating it at a pressure lower than that used for the impregnating stage or without pressure. The present invention therefore also relates to such preliminary stages or precursors for the composite materials according to the invention.

In addition to the reinforcing fibres and thermoplasts, the composite materials according to the invention and their precursors may contain gases, preferably in a bound or dissolved form, and/or liquids and/or solids which may serve to form additional cavities and;or modify the cavities in the lightweight composite materials according to the invention, respectively, support the expansion of the reinforcing fibre system.

The present invention also relates to a process for the production of lightweight composite materials and composite materials.

The process according to the invention for the production of lightweight composite materials is characterised in that a formation of reinforcing fibres containing cavities amounting to at least 30 vol.-% is impregnated with a thermoplast at a temperature above the glass transition temperature of the thermoplast and under a pressure at which the thickness of the formation of reinforcing fibres decreases by at least 10% during the process of impregnation, and a heat treatment is then carried out without pressure or at a lower pressure than that used for impregnation, at a temperature at which the thickness of the impregnated material increases by at least 10% at least in parts.

The process according to the invention for the production of composite materials is characterised in that a formation of reinforcing fibres containing at least 30 vol.-% of cavities is impregnated with a thermoplast at a temperature above the glass transition temperature of the thermoplast and under a pressure at which the thickness of the formation of reinforcing fibres decreases by at least 10% during the process of impregnation.

Suitable and preferred materials and arrangements for the formation of reinforcing fibres to be used, suitable and preferred thermoplasts and other substances and materials optionally added before or during impregnation are described above.

The required reduction in thickness of the formation of reinforcing fibres during the process of impregnation may generally be achieved by applying an absolute pressure in the region of 1.2 to 1000 bar, in many cases by applying an absolute pressure in the region of 1.5 to 200 bar.

The thermoplast may be brought together with the formation of reinforcing fibres by various means. For example, the thermoplast may be added as a molten substance (e.g. from a broad sheeting die attached to an extruder), as a solution or suspension (the solvent or dispersing agent should then be removed before or during the process of impregnation) or as powder (e.g. by whirl sintering or powder spraying). The thermoplast may also be incorporated in the formation of reinforcing fibres, for example, by subjecting reinforcing fibres together with thermoplast threads or mixed threads of reinforcing fibres and thermoplast threads to a textile process. In such a process, the thermoplast may also be in the form of tapes or yarn. Alternatively, the thermoplast may be applied as a film or granulate to the surface of the formation of reinforcing fibres and in the case of multi-layered formations of reinforcing fibres it may be placed between individual layers. The thermoplast may also be prepared directly on the formation of reinforcing fibres, e.g. by in situ polymerisation.

The thermoplast may be added all in one portion or it may be subdivided into several portions added successively. Different portions of the thermoplast may also be introduced in different forms, for example one part may be introduced together with the reinforcing fibres as a mixed fibre and another part may be introduced as a granulate, film or melt. If desired, different thermoplasts may be introduced simultaneously or successively.

The process according to the invention may be carried out in heatable static presses or in continuously operating presses, e.g. double belt presses. The heat required may be introduced by preheating some or all of the starting materials and/or by heating the press.

The heat treatment which follows impregnation is generally carried out at temperatures above the glass transition temperature of the thermoplast used.

The heat treatment may be terminated when the thickness of the impregnated material has increased by at least 10% in at least some areas of the material. The thickness preferably increases to 1.8 to 20 times the original thickness. When this increase in thickness takes place, cavities which reduce the unit weight form in the thermoplast matrix. It is for this reason that the resulting product is referred to as lightweight composite material. The increase in thickness generally occurs nearly instantaneously once the thermoplast has become fluid. The heat treatment may be carried out, for example, in a hydraulic press, a double belt press or a hydraulic press with a mould inserted therein or it may be carried out simply by opening the apparatus in which the impregnation was carried out. When presses are used, lightweight composite materials having a predetermined geometry may be obtained with the required ratios thicknesses by suitably adjusting the gap by using press moulds with suitable cavities. Thus semi-finished goods such as flat boards or moulded parts ready for use, such as seat shells, may be produced from the lightweight composite material according to the invention. The width of the gap is preferably so chosen that a slightly raised pressure is produced in the lightweight composite material in the final phase of expansion.

By suitably designing the gap in the press in which the heat treatment takes place, it is possible to obtain products which are uniformly thick over their whole surface or differ in thickness. If desired, several layers of composite materials according to the invention, which may differ in form and/or in the orientation of the reinforcing fibres may be introduced together into a press to be converted into lightweight composite materials according to the invention. This provides a very wide range of possible variations in form and thickness of the products obtained.

Basically stamping and hot flow moulding processes can be applied.

The production of lightweight composite materials according to the invention and of shaped parts from the lightweight composite materials according to the invention may be carried out, for example, in two successive cycles in the mould of a hydraulic press (so-called two-cycle processes). In such processes, the formation of reinforcing fibres (or cut-out pieces thereof) may be inserted between plates or into a mould after the addition of thermoplasts. A composite material according to the invention may then be produced in the first cycle under conditions of elevated temperature and pressure as described above. In the second cycle, the movable press ram may then be opened by a certain amount so that the heat treatment to produce a part of lightweight composite material according to the invention can be carried out immediately. If only a precursor is to be produced from the composite material according to the invention. the product is removed from the press after the first cycle or after only an incomplete heat treatment.

An advantageous process for the continuous production of flat-shaped lightweight composite materials of the type according to the invention is the so-called Two-Zone process carried out in a double belt press, in which the lightweight composite material is produced in two successive zones of the press in which the belts are adjusted to different distances apart. In a first pressure zone, the formation of reinforcing fibres is brought together with thermoplast and moulded under the given conditions of pressure and temperature to produce a composite material according to the invention. The above-described heat treatment to form a lightweight composite material according to the invention may then be carried out in a second zone, which differs from the first mainly by the greater distance between the belts. Endless flat shaped materials may be produced by this process.

The present invention also relates to moulded parts and finished products which contain the lightweight composite materials described above or consist of these materials. These moulded parts or finished products may consist, for example, of flat boards or flat or curved parts such as are required, for example, in the construction of motor vehicles, aircraft, ships and apparatus and in structural and civil engineering. Examples include the superstructures of vehicles, aircraft and ships, the upper works of transport vehicles and refrigeration trucks, the base units of vehicles, chassis, housings, facings, steps, roofs, walls, ceilings, frames, window frames, bathtubs, swimming pools, hangar constructions and the like, floors, gates, doors, containers, supporting frameworks, huts, embankment defences, supporting plates, shells, planks, tanks, silos, containers, seat shells, cupboards, sound insulating walls, helmets, boats, surfboards, musical instruments, basic materials for printed circuits, parabolic antennae, girders and spars, ribs, refrigerator doors, filters and heat exchangers. The shaped and finished goods may be supporting or self-supporting parts or partly supporting or non-supporting. They are distinguished by their low unit weight, their resistance to corrosion, high impact strength, high strength and rigidity, high energy absorption and sound absorption and good weldability. These moulded parts have no tendency to delaminate within a layer and they have a high tolerance to damage and low crack propagation and they are capable of further thermal deformation. The latter property facilitates the recycling of used parts.

The lightweight composite material according to the invention has a high quality of impregnation and in contrast to all lightweight bodies with textile reinforcements hitherto known they can be reshaped by heat. One important advantage of the lightweight composite material according to the invention is that when the finished part is originally shaped or when a semi-finished product or a finished part is reshaped, distinct differences in thickness and differences in specific gravity can be produced in a part in a single working stage. The thicknesses may vary, for example, from the thickness of the composite material according to the invention put into the process and the maximum thickness of the lightweight composite material, which is mainly determined by the structure of the reinforcing textile. In multilayered structures, it is possible by suitable temperature control to convert only individual layers into lightweight composite materials. The heat treatment which causes the reinforcing fibres to be placed upright and form cavities may be interrupted A change in thickness is generally accompanied by a change in unit weight and in the mechanical properties, in particular the flexural stiffness, the compression strength and tensile strength and the energy absorption. This enables a part produced from the lightweight constructional material according to the invention to be tailor-made for its particular application simply by varying the thickness of the material. Other possibilities of variation are provided by the arrangement of the reinforcing fibres in the original formation of reinforcing fibres.

The composite material according to the invention and the lightweight composite material according to the invention may be present in any form, for example in a flat form (e.g. as boards or sheets) or-in curved forms such as are obtainable by pressing in compression moulds of a static press.

The composite materials according to the invention are novel in principle on account of the compressed arrangement of their reinforcing fibres and the ability of the materials to be expanded by heat to form lightweight composite materials. The lightweight composite material according to the invention is also novel on account of its three-dimensionally arranged reinforcing fibre structure which is well impregnated with thermoplast and contains a high proportion by volume of cavities and on account of its ability to be shaped by heat and subsequently reshaped by heat.

It is distinctly surprising that lightweight composite materials having the outstanding properties described above (see also the Examples) can be provided by the present invention since according to EP-A-0 148 763 this was not to be expected with reinforcing fibres longer than those used there.

EXAMPLES

Example 1

A plane piece of 3/3-right-right knitted fabric covered with Teflon(R) film on both sides was stretched over an aluminium plate measuring 30 × 30 cm which was fitted with strips for pins at the sides. The arrangement was covered with a steel plate and prepressed for 5 minutes under an absolute pressure of 2 bar in a static plate press which had been preheated to 230° C. The knitted fabric introduced was a mixed fabric of Polyamide-6 threads and endless glass fibres containing 48.5% by weight of glass fibres. Three mixed knitted fabrics prepressed as described above were placed together with two layers of glass fabric in linen weave (obtained from Interglas, Ulm, No. 92150) and two layers of Polyamide-6 film 0.1 mm in thickness according to the following arrangement:
 1. Glass fabric
 2. Polyamide-6 film
 3. Knitted prepressed fabric
 4. Knitted prepressed fabric (direction of stitches perpendicular to 3.)
 5. Knitted prepressed fabric (direction of stitches parallel to 3.)
 6. Polyamide-6 film
 7. Glass fabric.

This stack of layers was covered on the outside with Teflon(®)-sprayed aluminium film and then placed in a steel frame having internal dimensions of 30 × 30 × 0.35 cm. The whole arrangement was then placed between two steel plates 2.5 mm in thickness in a static plate press which had been pre-heated to 230° C. and the arrangement was left in this press for 10 minutes under an absolute pressure of 2 bar and then compressed by heating under an absolute pressure of 21 bar for 5 minutes. The product was then cooled to room temperature at this pressure.

The resulting composite material, which had a thickness of 3.5 mm, was washed for one hour in water and then placed in a metal frame having internal dimensions of 30 × 30 × 1.5 cm, covered on both sides with Teflon(R)sprayed steel plates and then left in the preheated press for 10 minutes at 270° C. under an absolute pressure of under 1.5 bar. The composite material expanded under this treatment to give rise to a lightweight composite material having a thickness of about 14 mm, a density of about 0.39 g/cm³, a glass content of 55% by weight and a Polyamide-6 content of 45% by weight.

The lightweight composite material produced as described above is referred to below as Material 1 according to the invention.

Measurements were also carried out on composite materials available commercially for comparison purposes. The following materials were used:
 (a) Sandwich boards with aluminium honeycomb sheets and covering layers of aluminium sheet 0.5 mm in thickness, so-called M-Boards which are available under the name of "Aerolam(®) Boards". This composite material will be referred to below as Comparison material I.
 (b) Sandwich boards with aramide honeycomb layers and phenol resin covering layers obtainable under the name of Fibrelam(®) boards. This composite material will be referred to below as Comparison material II.

Example 2

(Short rod bending test)

Short rods measuring 80 × 30 × 14 mm were first sawn out of the materials to be measured and three point bending tests were carried out according to DIN LN 29 971 (Aeronautical standard for short rod bending tests) (diameter of fin 6 mm, diameter of each support 10 mm, distance of supports 5×14=70 mm, maximum sagging 14 mm, rate of loading 1 mm/min). No shearing breakages occurred in Material 1 according to the invention under these conditions even when sagging was 14 mm whereas Comparison materials I and II of similar dimensions showed signs of permanent destruction with peeling off of the covering surfaces and destruction of the honeycomb arrangement. The permanent deformations were as follows:

| | |
|---|---|
| Material 1 according to the invention: | 4 mm |
| Comparison material I: | 13 mm |
| Comparison material II: | 6 mm. |

After slow removal of the bending force, the samples were again loaded under the same bending conditions from the back. Comparison materials I and II only had about 5% of the initial rigidity whereas Material 1 according to the invention still had about 50% of the initial rigidity after this second bending procedure.

This shows less preliminary damage of Material 1 according to the invention and hence greater tolerance to damage (so-called benign response to damage).

Example 3

(impact penetration test)

Samples measuring 60 × 60 × 14 mm were sawn out of the materials to be tested and impact penetration tests were carried out according to DIN 53 443 with a potential total energy of 100 Nm. Comparison material I was punctured straight through and Comparison material II was compressed by over 90% and the upper covering layer tore and became detached while Material 1 according to the invention merely became indented by about 60% in the region of the penetrating rod. This means that the area of damage remained localized in Material 1 according to the invention.

It was only in Material 1 according to the invention that the lower covering layer showed no significant damage. This is another sign of the basically benign response to damage of Material 1 according to the invention.

The following energies were measured:

| | Amount of energy taken up (Nm) | |
|---|---|---|
| | At beginning of tear | In the final state |
| Material 1 according to the invention | 18 (small tear) 70 (tear in upper covering layer) | 80 (indentation) |

-continued

| | Amount of energy taken up (Nm) | |
|---|---|---|
| | At beginning of tear | In the final state |
| Comparison material I | 12 (tear of upper covering layer) | 80 (puncture) |
| Comparison material II | 9 (tear of upper covering layer) | 43 (compression and detachment of the covering layer) |

Example 4

(Bending test analogous to bending pulsating test)

A test sample measuring 250 × 30 × 14 mm was sawn out of Material 1 according to the invention in accordance with the geometry of the test sample for the bending pulsating test proposed in DIN 53 398. A static bending test was carried out with a support distance of 240 mm, a width of fin of 40 mm, a fin radius of 100 mm and a support diameter of 10 mm.

In this test it was found that under the action of the bending force (maximum 347 N), only the upper covering layer (pressure zone) loosened to a certain degree over the whole surface of the rod and partially became detached, which is a clear indication that tension peaks are evened out over a large area and that the total energy applied locally is distributed relatively uniformly over the whole sample.

No visible damage occurred in the tension zone.

Examples 5 to 1

Further lightweight composite materials according to the invention were produced as described in Example 1. The details are shown in Table 1 below.

The following abbreviations are used in Table 1:

| | |
|---|---|
| GFS = | Glass fibre |
| GG = | Glass fabric in basket weave |
| GS = | Knitted fabric (produced on a flat knitting machine) |
| GVPA = | Glass fibre web reinforced polyamide, thickness 3.5 mm, glass content 70% by weight |
| p = | Stitch arrangement parallel to adjacent layer |
| PA = | Polyamide-6 |
| PAFO = | Polyamide-6 film |
| PAFS = | Polyamide-6 fibre |
| PC = | Polycarbonate |
| PCFS = | Polycarbonate fibre |
| RR = | Right Right |
| s = | Stitch arrangement perpendicular to adjacent layer |

TABLE 1

| Example No. | Type of knitting (% = % by wt.) (Height = mm) | Arrangement | Nature of thermoplast | Proportion of glass (fibre + fabric) (% by wt.) | Properties of the lightweight composite material produced | | |
|---|---|---|---|---|---|---|---|
| | | | | | Thickness (mm) | Density (g/cm$^3$) | Appearance and mechanical properties |
| 5 | 2/2 RR GFS 50.7% PCFS 49.3% | GS/GSp | PC | 50.7 | 8 | 0.425 | uniform direction of stitches; stable composition |
| 6 | 3/3 RR GFS 51.5% PAFS 48.5% | GG/PAFO GS/GSs/ GSp/PAFO/GG | PA | 55 | 12 | 0.48 | smooth, uniform board; no shearing breakages, high tolerance to damage, medium absorption of forces |
| 7 | 2/2 RR GFS 68% PAFS 32% Height of stitches: 3.5 | GS/GSs/GS | PA | 68 | 15 | 0.49 | smooth board with uniform direction of stitches; medium shear strength (compared with Comparison material II) |
| 8 | 2/2 RR GFS 68% PAFS 32% Height of stitches: 7 | GG/PAFO/ GS/GSs/ PAFO/GG | PA | 71 | 12 | 0.39 | smooth, uniform board; no shearing breakages, only low absorption of forces |
| 9 | 3/3 RR GFS 68% PAFS 32% Height of stitches: 3.5 | GG/PAFO/ GS/GSs/ GS/PAFO/ GG | PA | 71 | 15 | 0.48 | smooth, uniform board; no shearing breakages, high tolerances to damage |
| 10 | 3/4 RR GFS 68% PAFS 32% | GG/PAFO/ GS/GSs/ GS/PAFO/ GG | PA | 71 | 18 | 0.40 | smooth, uniform board; no shearing breakages, high tolerances to damage, low permanent deformation |
| 11 | 3/3 RR GFS 51.55% PAFS 48.45% | GG/PAFO/ GS/GVPA/ GS/PAFO/ GG | PA | 58 | 12 | 0.77 | smooth, uniform board; very high interlaminar shear strength, very high absorption of forces |
| 12 | 1/1 half cardigan GFS 51.55% PAFS 48.45% 118 stitches to 300 mm width | GS/GSs/ GS | PA | 52 | 15 | 0.22 | smooth, uniform honeycomb pattern: no shearing breakages, low absorption of forces |
| 13 | 1/1 half | GS/GSs/ | PA | 52 | 15 | 0.31 | smooth, uniform honey- |

TABLE 1-continued

| Example No. | Type of knitting (% = % by wt.) (Height = mm) | Arrangement | Nature of thermo-plast | Proportion of glass (fibre + fabric) (% by wt.) | Properties of the lightweight composite material produced | | |
|---|---|---|---|---|---|---|---|
| | | | | | Thickness (mm) | Density (g/cm³) | Appearance and mechanical properties |
| | cardigan GFS 51.5% PAFS 48.45% 130 stitches to 300 mm width | GS | | | | | comb pattern; no shearing breakages, medium tolerance to damage |
| 14 | 3/3 RR GFS 51.55% PAFS 48.45% | GG/PAFO/ GG/PAFO/ GG/GSs/ FS/PAFO. GG/PAFO/GG | PA | 59 | 15 | 0.43 | smooth, uniform board; no shearing breakages, very low permanent deformation |

Example 15

(Carbon fibres instead of glass fibres)

As in Example 1 three superimposed, prepressed layers of the mixed knitted fabric described below were compressed by heating and washed and the composite material could also be expanded to form a lightweight composite material. The following mixed knitted fabric was used:

type of knit: 1/1 half cardigan
41.5% by weight of endless carbon fibres (of type 3KE XAS) of 200 tex
58.5% by weight of continuous polyamide-6 filaments ® Enkalon produced by the Enka-Akzo Company) of 3 × 94 tex.

| Properties determined: designation of the sample produced | thickness [mm] | specific weight [g/cm³] | remarks |
|---|---|---|---|
| composite | 3 | 1,35 | — |
| light weight composite I | 12 | 0,36 | — |
| light weight composite II | 16 | 0,29 | energy consumption at 40 compression: 3 times that of a glass fiber light weight composite, 7 times that of an aramide-honeycomb core |
| light weight composite III | 17 | 0,27 | — |

We claim:

1. A lightweight composite material comprising reinforcing fibers in a thermoplast matrix, the fibers being at least 50 mm in length and being three-dimensionally arranged in the material, and the thermoplast matrix being characterized by the presence of cavities therein.

2. A lightweight composite material according to claim 1 wherein the reinforcing fibers have a higher softening interval or melting point than the thermoplast matrix.

3. A lightweight composite material according to claim 1 wherein the proportion of reinforcing fibers is 15 to 90% by weight of the lightweight composite material.

4. A composite material comprising reinforcing fibers in a thermoplast matrix, the fibers being over 50 mm in length and being three-dimensionally arranged in the thermoplast matrix.

5. Moulded parts and finished products consisting or containing the lightweight composite material according to claim 1.

6. Molded parts and finished products comprising the lightweight composite material according to claim 2.

7. Molded parts and finished products comprising the lightweight composite material according to claim 3.

8. A process for producing lightweight composite materials comprising reinforcing fibers provided in a thermoplast matrix, the reinforcing fibers being at least 50 mm in length, and the lightweight composite material being characterized by the presence of cavities in the thermoplast matrix, the process comprising:
   (a) providing a formation of said reinforcing fibers in a three-dimensional arrangement such that empty spaces define at least 30% by volume of the formation;
   (b) impregnating the formation with thermoplast at a temperature above the glass transition temperature of the thermoplast under pressure conditions sufficient to reduce the thickness of the formation by at least 10%, thereby forming a composite material; and
   (c) thermally treating the composite material using temperature and pressure conditions which induce expansion of the thickness of the composite material by at least 10%, whereby cavities are formed in the thermoplast matrix during expansion.

9. A process as claimed in claim 8 wherein the temperature at which the formation is impregnated with thermoplast is below the melting point of the reinforcing fibers.

10. A process as claimed in claim 8 wherein the formation of the composite material is carried out in a press.

11. A process as claimed in claim 10 wherein the thermal treatment is carried out in a press.

12. A process as claimed in claim 11 wherein the formation of the composite material and the thermal treatment are carried out in successive cycles in a two-cycle press.

13. The process as claimed in claim 8 further comprising the step of introducing gas into the thermoplast matrix during the thermal treatment.

14. The process as claimed in claim 8 further comprising providing a gas-releasing substance in the thermoplast which is capable of producing gas in the thermoplast matrix upon thermal treatment.

15. A process for producing a composite material comprising reinforcing fibers provided in a thermoplast matrix, the reinforcing fibers being at least 50 mm in length, the comprising:
   (a) providing a formation of reinforcing fibers in a three-dimensional arrangement such that empty spaces define at lease 30% by volume of the formation; and
   (b) impregnating the formation with thermoplast at a temperature above the glass transition temperature of the thermoplast, under pressure conditions sufficient to reduce the thickness of the formation by at least 10%.

16. A lightweight composite material produced by the process of claim 8.

17. A lightweight composite material produced by the process of claim 9.

18. A lightweight composite material produced by the process of claim 13.

19. A lightweight composite material produced by the process of claim 14.

20. A composite material produced by the process of claim 15.

* * * * *